United States Patent
Saint et al.

[19]

[11] Patent Number: 5,813,681
[45] Date of Patent: Sep. 29, 1998

[54] CHILD WALKER

[75] Inventors: Nathanael Saint; Curtis Michael Hartenstine, both of Morgantown, Pa.

[73] Assignee: Graco Children's Products Inc., Elverson, Pa.

[21] Appl. No.: 634,016

[22] Filed: Apr. 17, 1996

[51] Int. Cl.$^6$ .................................................. B62B 7/00
[52] U.S. Cl. .............................. 280/87.051; 280/33.994; 188/20; 188/72.9; 297/5
[58] Field of Search ...................... 280/87.021, 87.051, 280/33.994, 87.041; 180/282, 283, 83; 188/71.1, 5, 20, 1.12, 72.9; 297/5

[56] References Cited

U.S. PATENT DOCUMENTS

| | | |
|---|---|---|
| 284,647 | 9/1883 | Matcham . |
| 286,032 | 10/1883 | Mason . |
| 292,386 | 1/1884 | Tatum et al. . |
| D. 295,397 | 4/1988 | Brownlie et al. ............... D12/130 |
| 301,440 | 7/1884 | Fahys . |
| 304,841 | 12/1884 | Grammes et al. . |
| 308,657 | 12/1884 | Dyer . |
| 613,501 | 11/1898 | Dickinson . |
| 936,293 | 10/1909 | Black . |
| 946,391 | 1/1910 | Murray . |
| 1,265,687 | 5/1918 | Linkhart et al. . |
| 2,308,626 | 1/1943 | Reinholz .................... 155/23 |
| 2,402,861 | 6/1946 | Winnick ...................... 46/32 |
| 2,475,130 | 7/1949 | Davis ......................... 188/5 |
| 2,537,909 | 1/1951 | Puddester .................... 155/30 |
| 3,145,048 | 8/1964 | Dowdy et al. ................ 297/5 |
| 3,366,201 | 1/1968 | Pesta ........................ 188/110 |
| 3,623,575 | 11/1971 | Schiltigheim et al. .......... 188/31 |
| 3,710,895 | 1/1973 | Freedman .................... 188/5 |
| 3,788,695 | 1/1974 | Salem ........................ 297/6 |
| 3,954,160 | 5/1976 | Carr ......................... 188/72.9 X |
| 4,019,756 | 4/1977 | Ishida ....................... 280/649 |
| 4,045,045 | 8/1977 | Boucher et al. .............. 280/87.2 W |
| 4,084,663 | 4/1978 | Haley ....................... 188/19 X |
| 4,108,468 | 8/1978 | Orlanski .................... 280/648 |
| 4,211,426 | 7/1980 | Motloch ..................... 280/87.02 W |
| 4,231,582 | 11/1980 | Moss ........................ 280/87.02 W |
| 4,359,242 | 11/1982 | Gerken et al. ............... 297/5 |
| 4,360,951 | 11/1982 | Bucher ...................... 280/33.994 X |
| 4,361,216 | 11/1982 | Overbeen ................... 192/36 |
| 4,364,576 | 12/1982 | Kassai ...................... 280/87.02 W |
| 4,433,869 | 2/1984 | Payne, Jr. et al. ........... 295/5 |
| 4,503,943 | 3/1985 | Tsukui ...................... 188/5 |
| 4,576,392 | 3/1986 | Quinlan, Jr. ................ 230/87.02 W |
| 4,579,359 | 4/1986 | Schwartz .................... 280/87.02 W |
| 4,615,523 | 10/1986 | Chen ........................ 272/70.3 |
| 4,618,033 | 10/1986 | Kassai ...................... 188/20 |
| 4,633,544 | 1/1987 | Hicks ....................... 188/83 X |
| 4,699,392 | 10/1987 | Ku .......................... 280/87.02 W |
| 4,714,141 | 12/1987 | Kassai ...................... 188/20 |
| 4,759,098 | 7/1988 | Ko .......................... 16/29 |
| 4,759,541 | 7/1988 | Chen ........................ 272/70.3 |
| 4,776,405 | 10/1988 | Brice ....................... 180/11 |
| 4,799,700 | 1/1989 | Knoedler et al. ............. 280/87.051 |
| 4,815,569 | 3/1989 | Norman ...................... 188/5 |
| 4,819,767 | 4/1989 | Laird ....................... 188/71.1 X |
| 4,844,209 | 7/1989 | Sedlack ..................... 188/5 |
| 4,884,799 | 12/1989 | Chai ........................ 272/70.3 |
| 4,953,667 | 9/1990 | Bigo ........................ 188/31 |
| 4,988,138 | 1/1991 | Damma et al. ................ 293/127 |
| 5,001,808 | 3/1991 | Chung ....................... 16/18 CG |
| 5,040,641 | 8/1991 | Phillips et al. ............. 188/1.12 |

(List continued on next page.)

FOREIGN PATENT DOCUMENTS

WO 8403073  8/1984  WIPO .............................. 280/33.994

Primary Examiner—Robert J. Oberleitner
Assistant Examiner—Pamela J. Lipka
Attorney, Agent, or Firm—Richard B. O'Planick

[57] ABSTRACT

An improved child walker with a variety of safety features is disclosed. The child walker preferably includes three rolling supports which are stable and tip resistant in a wide variety of circumstances. The child walker provides for braking when one of the rolling supports passes an edge or a ledge of the floor surface. The rolling mechanism of the child walker advantageously limits the direction of travel allowed by the child to improve safety, and can be adjusted to control the speed of the walker.

35 Claims, 10 Drawing Sheets

U.S. PATENT DOCUMENTS

| | | | |
|---|---|---|---|
| 5,054,851 | 10/1991 | Chiu | 297/136 |
| 5,056,805 | 10/1991 | Wang | 280/47.36 |
| 5,080,383 | 1/1992 | Hsieh | 280/87.051 |
| 5,112,044 | 5/1992 | Dubats | 188/1.12 X |
| 5,168,601 | 12/1992 | Liu | 16/126 |
| 5,203,581 | 4/1993 | Jankowski | 280/87.051 |
| 5,244,443 | 9/1993 | Cerda | 482/68 |
| 5,273,147 | 12/1993 | Beigang et al. | 192/104 |
| 5,324,064 | 6/1994 | Sumser et al. | 280/649 |
| 5,342,072 | 8/1994 | Prasad | 280/87.051 |
| 5,366,231 | 11/1994 | Hung | 280/87.051 |
| 5,383,542 | 1/1995 | Stockton | 192/45.1 |
| 5,449,185 | 9/1995 | Sykes | 280/87.051 |
| 5,529,150 | 6/1996 | Buckley et al. | 188/72.9 |
| 5,564,724 | 10/1996 | Huang | 280/87.051 |
| 5,590,892 | 1/1997 | Hu | 280/87.051 |

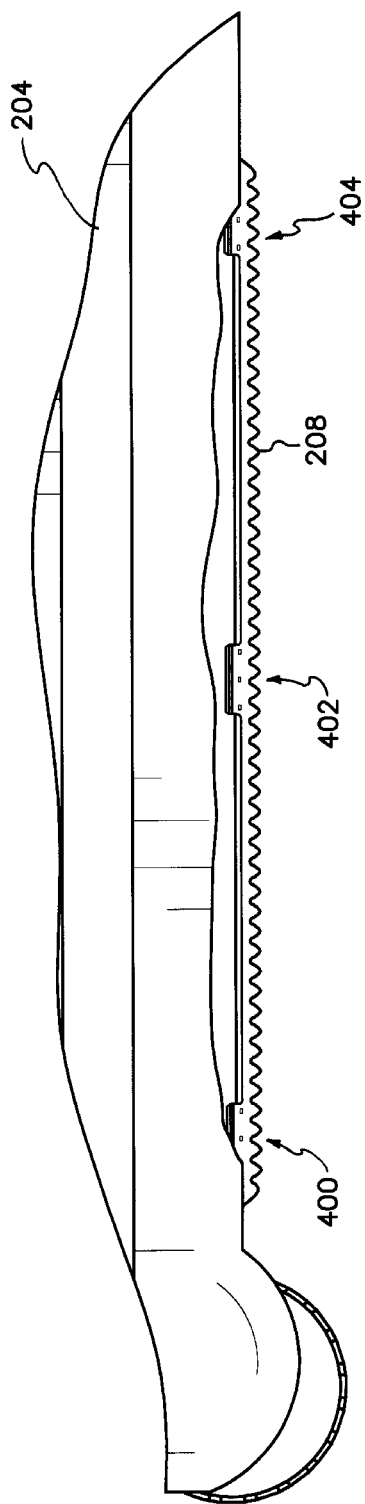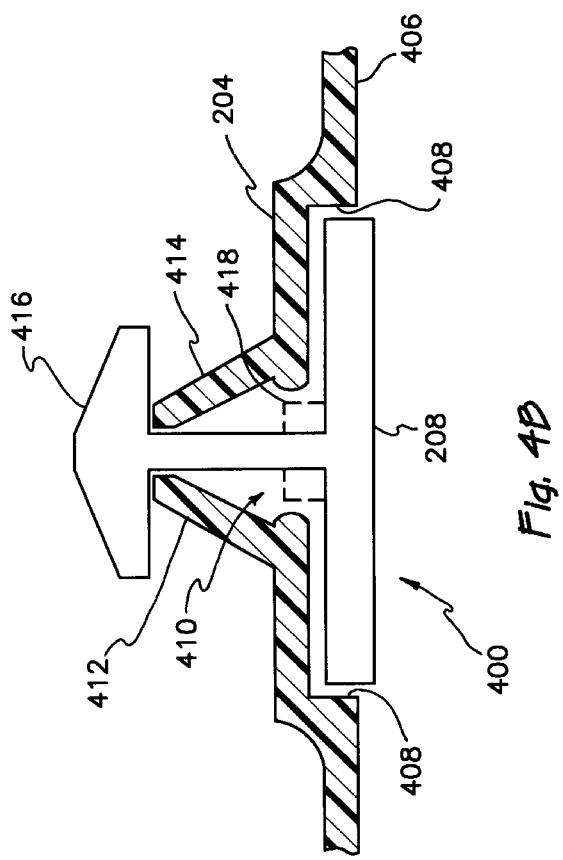
Fig. 4A
Fig. 4B

CHILD WALKER

BACKGROUND OF THE INVENTION

1. Field of the Invention

The present invention relates to a child walker with innovative new safety features, and more particularly to a child walker with an automatic braking capability and with adjustable speed control.

2. Discussion of the Related Art

Child walkers provide a convenient means for an infant to be entertained, before, during, and after the transition from crawling to walking. Walkers provide support for a child in a seated position, but are readily movable by the child in a standing position. Conventional walkers typically include four or more wheels located at the corners of the walker.

Conventional walkers typically do not employ any braking mechanism to control the speed of the walker. Furthermore, conventional walkers typically do not include an effective means by which the walker may be stopped when it passes over an edge of a floor. Accordingly, conventional walkers are generally provided with instructions and warnings advising against the use of the walker without appropriate caregiver supervision, or against the use in the vicinity of floor edges, such as stair steps. These instructions and warnings, although practical and effective when followed, are not always observed.

An example of a conventional walker which attempts to respond to these concerns may be found in U.S. Pat. No. 4,699,392 ("the '392 patent") to Ku, issued Oct. 13, 1987. The '392 patent is directed to an improved rolling carriage or baby walker equipped with a safety brake system for reacting to the presence of a ledge. In the illustrated embodiment, a hollow base 18 is hexagonally-shaped, and includes six wheels or casters disposed around the base. FIGS. 2 and 3 of the '392 patent show that as the walker passes over the ledge, a pivoting support leg 34 pivots to prevent the walker from further movement.

SUMMARY OF THE INVENTION

Accordingly, the present invention is directed to a child walker that substantially obviates one or more of the consequences of improper use of the related art walkers.

An object of the present invention is to provide a child walker that has improved stability and resistance to tipping.

Another object of the present invention is to provide a child walker which provides immediate braking when the walker passes over an edge or a ledge.

Yet another object of the present invention is to provide a child walker which limits the direction of travel allowed by the child to maximize its stability.

It is a further object to provide a child walker which can be adjusted by a caregiver to control the speed of the walker.

It is still a further object to provide a rolling mechanism adapted for connection to a base member of a child walker which provides immediate braking when the mechanism proceeds over an edge or a ledge and which limits the direction of travel of the child walker.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purposes of the present invention, as embodied and broadly described, the present invention providing a rolling mechanism for moving over a floor surface and adapted for connection to a base member of a child walker, the rolling mechanism consisting of a first rolling support, a second rolling support, and a third rolling support arranged in a triangular configuration such that when at least one of the first, second, and third rolling supports passes an edge of the floor surface, the child walker tips toward the one rolling support and the base member contacts the floor surface to thereby inhibit the child walker from moving.

In another aspect, the present invention is directed to a child walker movable over a floor surface including a seat structure for holding a child, a connecting structure connected to the seat structure, a base member connected to the connecting structure, and a plurality of wheels connected to the base member configured such that when at least one wheel passes an edge of the floor surface, the child walker tips and the base member contacts the floor surface to thereby inhibit the child walker from moving.

In yet another aspect, the present invention is directed to a method of controlling a child walker which includes a seat, a base member, and a plurality of wheels, the method including the steps of rolling the child walker over a floor surface on the plurality of wheels, passing one wheel of the plurality of wheels over an edge of the floor surface, tipping the child walker towards the one wheel, and contacting the floor surface with the base member to inhibit the child walker from moving.

In a still further aspect, the present invention is directed to a child walker with a speed control feature comprising a seat structure for holding a child, a base member connected to the seat structure, a plurality of wheels connected to the base member, and a braking mechanism connected to at least one wheel of the plurality of wheels for providing resistance against rotation of the one wheel to thereby control the speed of the child walker.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 4A is cut-away side view of a friction strip and a base member in accordance with an embodiment of the present invention;

FIG. 4B is sectional view of the base member showing the friction strip inserted in accordance with an embodiment of the present invention;

DETAILED DESCRIPTION OF THE PREFERRED EMBODIMENTS

Reference will now be made in detail to the preferred embodiments of the present invention, examples of which are illustrated in the accompanying drawings.

Figure 1:
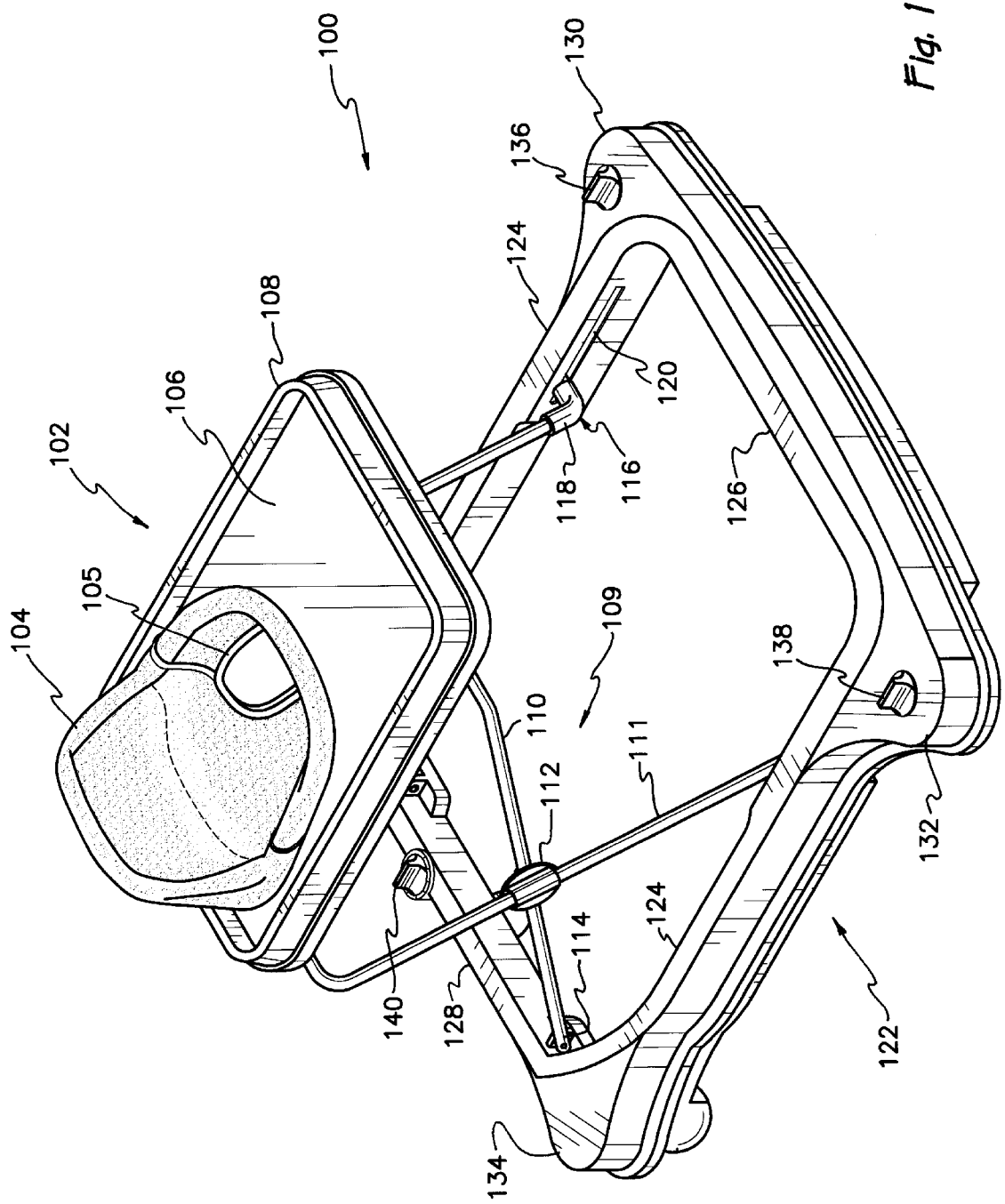
FIG. 1 is a perspective view of an embodiment of the child walker in accordance with the present invention.

FIG. 1 shows a preferred embodiment of a child walker 100 in accordance with the present invention. In particular, the child walker 100 generally comprises a seat structure 102 for holding a child, a connection structure 109 connected to the seat structure 102, and a base member 122 connected to the connection structure 109.

The seat structure 102 includes a cloth-type seat 104 preferably with two leg openings for the child, a tray area 106, and tray edge 108. Only one of the leg openings 105 is shown in FIG. 1. The seat 104 preferably includes a raised back rest to support the child, and a lowered front portion to allow the child to access the tray area 106 for playing with toys, or the like. The tray area 106 and tray edge 108, as well as other structural components described hereinafter, such as the base member 122, may be comprised of a polypropylene plastic material or similar material.

The connection structure 109, which generally comprises a front and a rear connecting member 110 and 111, respectively, is disposed in an X-pattern, as shown in FIG. 1. The connecting members 110 and 111 are generally connected at the front and rear of the seat structure 102, respectively, and may take the form of a metal, U-shaped tube. As is conventionally known, the rear connecting member 110 may be pivotally connected to the seat structure 102, and the front connecting member 111 may be pivotally and slidably attached to the seat structure 102. The slidable connection of the front connecting member 111 allows for the seat structure 102 to move vertically, thereby allowing the child to bounce. A spring resistance can be added to the slidable connection to facilitate such bouncing.

The front and rear connecting members 110 and 111 are interconnected to each other at a rotating bracket 112, as shown in FIG. 1. The bracket 112 allows for the front and rear connecting members 110 and 111 to rotate with respect to each other as the seating structure moves vertically.

The lower end of the front connecting member 110 is attached to the base member 122 at a pivot point 114, and the lower end of the rear connecting member 111 is connected at a slidable connection point 116. The right side of the rear connecting member 111 also is connected at a slidable connection point (not shown in FIG. 1).

The sliding connection 116 generally comprises a sliding piece 118 which is inserted into a slot 120 in the base member 122. FIG. 1 shows the child walker 100 with the seat structure 102 at its uppermost position and with the sliding piece 118 toward the rear of the slot 120. As the seat structure 102 moves vertically, the sliding piece 118 slides in the slot 120, as does the slidable connector (not shown) between the front connection member 110 and the seat structure 102. It should be understood that any other conventional structure could be utilized to allow the seat structure 102 to move in the vertical direction if that feature is desired. Of course, the interconnection of the connecting members 110 and the seat structure 102 can be accomplished by any conventional technique. For example, such an interconnection approach is described in U.S. Pat. No. 4,433,869, to Payne Jr., et al., issued Feb. 28, 1984, which is incorporated herein by reference.

The base member 122 comprises a generally rectangle-shaped structure, including left and right side portions 124, a front portion 126, and a rear portion 128. A left front extension 130 is provided where the left side portion 124 and front portion 126 interconnect. Similarly, a right front extension 132 is provided where the right side portion 124 and the front portion 126 interconnect.

A right rear extension 134 is provided where the right side portion 124 and the rear portion 128 interconnect and a similar left rear extension (not shown in FIG. 1) is also provided. The right rear extension 134 and left rear extension each provide for a support pod to provide additional stability to the child walker 100.

On the top surface of the left and right front extensions 130 and 132 are shown left and right adjustment knobs 136 and 138, respectively. As explained in more detail below with regard to FIGS. 5–7, the left and right adjustment knobs 136 and 138 provide for a height adjustment feature for a rolling support (not shown in FIG. 1) in the preferred embodiment. A rear brake control knob 140 is located on the rear portion 128 of the base member 122. As explained in more detail below with regard to FIGS. 8–9, the rear brake control knob 140 provides for the adjustment of a brake on a rear rolling support (not shown in FIG. 1) in the preferred embodiment of the child walker 100.

In the preferred embodiment, the seat structure 102 is connected to the base member 122 via the connecting members 110 and 111 at a position toward the rear portion 128 of the base member 122, and away from the front portion 126 of the base member 122. In addition, as compared to conventional walkers, the preferred embodiment generally provides for an extended (i.e., elongated) base member 122. In particular, the side portion 124 is are extended toward the front of the child walker. As explained in more detail below, these features provide for increased stability by moving the center of mass toward the rear of the child walker 100, and by increasing the amount of reaction time allowed when a preferred walker is moving in a generally forward direction and encounters a problematic situation, such as an edge or ledge, or a collision.

The present invention, in its broad aspects, considers an embodiment directed to a rolling mechanism for moving over a floor surface. The preferred rolling mechanism may be connected to a base member of a child walker, but the general concepts may be useful for other applications. The preferred rolling mechanism consists of a first, second, and a third rolling support in a triangular configuration with the center of mass of the child walker being located within the triangle, and preferably in a central area of the triangle. As will be appreciated, this preferred mechanism provides numerous advantages over the prior art. The following explanation will explain those advantages.

In general, the minimum number of support points necessary to support a free-standing rigid structure which is not affixed to a support is three. An example of such is a tripod structure. When one of those support points is removed, the rigid structure will tip and fall.

A preferred embodiment of the present invention uses this concept to provide a vastly improved child walker with three rolling supports. When one of the rolling supports is removed, the child walker immediately begins to tip toward the rolling support that was removed, and therefore no longer continues to roll.

In the context of the preferred child walker approaching an edge or a ledge of the floor surface, as soon as one of the rolling supports passes over the edge, the child walker begins to tip in the direction of that rolling support. Immediately thereafter, the base member of the preferred child walker contacts the floor surface to inhibit the child walker from moving any further. As can be seen, this preferred structure advantageously allows the walker to stop well before the center of mass of the walker approaches the edge or ledge. This is contrary to a conventional walker with four or more wheels which can continue to roll on the remaining wheels when one of the wheels passes over an edge.

As used herein, the term rolling support is intended to be broadly interpreted to mean any structure which will achieve one or more of the benefits of the disclosed rolling mechanism. The benefits of the present invention can be achieved with many configurations, of course. In particular, more than three wheels could be utilized to achieve the three rolling supports of this embodiment of the present invention. For example, more than one wheel (i.e., two wheels) can serve as a single rolling support if the wheels are sufficiently close together to achieve the desired operation noted above. Moreover, the present invention in its broader aspects does not require a single rear wheel as shown in the accompanying figures, although it is preferred.

As explained below, a combination of two caster wheels in front and a rear wheel are utilized as the three rolling supports in the preferred embodiment. For convenience, the remainder of this specification will refer to this preferred configuration, but it should be interpreted in view of the broad inventive concepts noted above.

Figure 2:
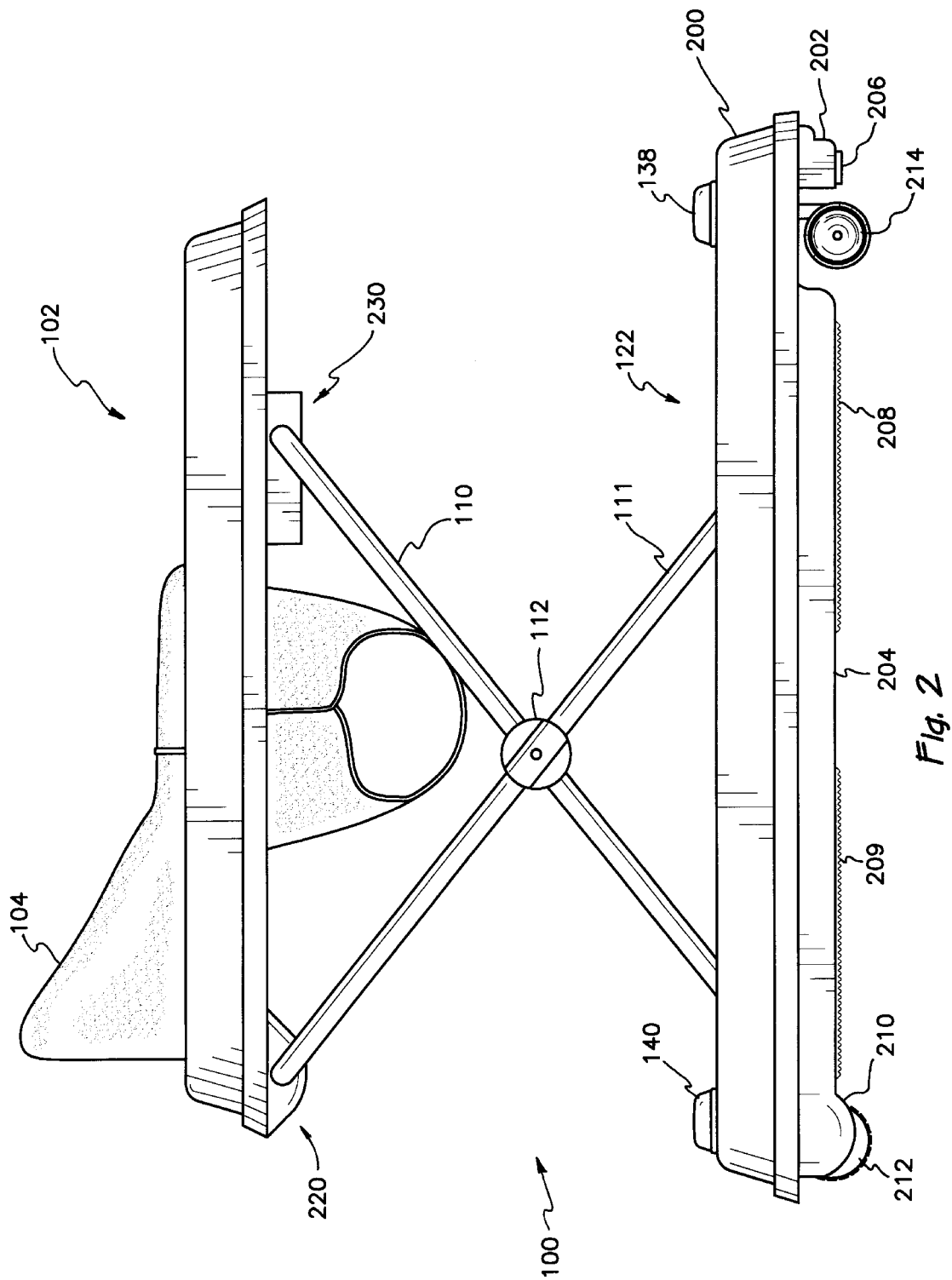
FIG. 2 is a side view of an embodiment of the child walker in accordance with the present invention.

FIG. 2 shows a side view of the child walker 100. FIG. 2 shows that the base member 122 is preferably comprised of an upper base 200, a front base extension 202 connected thereto, and a side base extension 204 also connected thereto. A front friction strip 206 is connected to the front base extension 202 and a pair (front 208 and rear 209) of side friction strips are connected to the side base extension 204. The friction strips are preferably comprised of a material to maximize their frictional affect on the floor surface. For example, a thermoplastic (TPE) material can be used for the friction strips.

The base member 122 is generally comprised of an upper base 200, a front base extension 202, and a pair of side base extensions 204 connected thereto, as shown in FIG. 2. Note that a left side base extension is not shown in FIG. 2.

A rear wheel 212, a right front swivel caster 214, and a left front swivel caster (not shown in FIG. 2) are connected to the base member 122. In the preferred embodiment, the rear wheel 212 comprises a non-swivelling wheel. The specific interaction and operation of the base extensions, friction strips, front swivel casters, and rear wheel are described in more detail hereinafter.

FIG. 2 shows more clearly the rear connecting member 111 connected to the seat structure 102 at a pivot point 220, and the front connecting member 110 connected to the front portion of the seat structure 102 with a slidable and pivotable connection 230.

Figure 3:
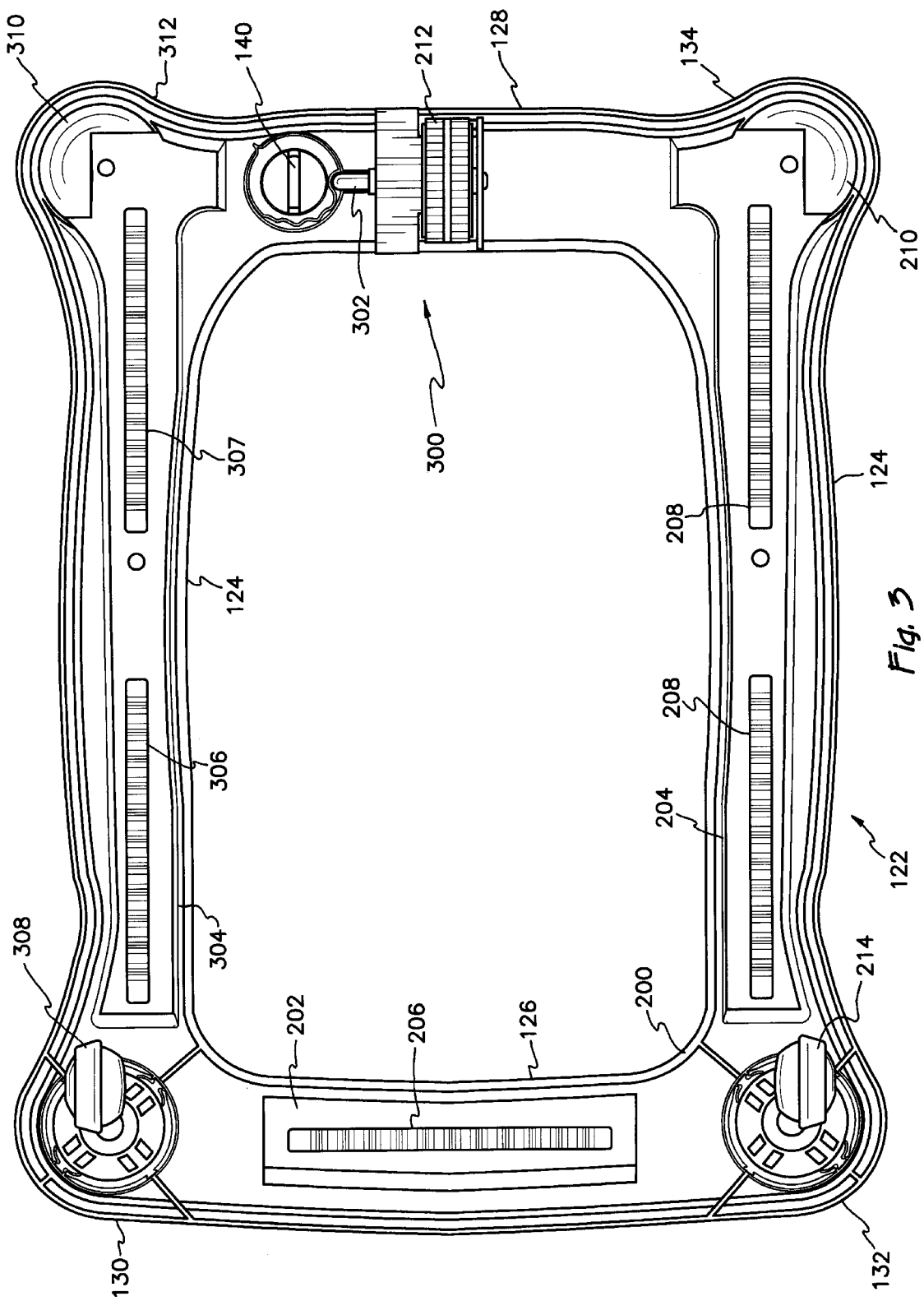
FIG. 3 is a bottom view of an embodiment of a child walker in accordance with present invention.

FIG. 3 shows a bottom view of the base member 122 in more detail. A wheel braking mechanism 300 is generally shown disposed along the rear portion 128 of the base member 122, and a left front swivel wheel 308 is shown connected to the base member 122, and is similar to the right front swivel wheel 214 previously described. The swivel wheels 214 and 308 are preferably located in the front extensions 132 and 130, respectively. This feature allows the swivel wheels 214 and 308 to be located at a maximum distance apart from each other (and the center of mass of the walker) thereby to increase stability.

The wheel braking mechanism 300 includes a rear wheel 212 connected to the base member at about a center point of the rear portion 128. The wheel 212 preferably includes a series of transverse ridges on a rubber tire to improve traction and further includes a solid center strip circumscribing the tire to provide for smooth rolling on the floor surface. The rear braking mechanism 300 further includes a brake control knob 140, generally shown in FIG. 3, adjacent to an axle 302 which passes through the rear wheel 212. As explained in more detail below with regard to FIGS. 8–9, the control knob 140, axle 302, rear wheel 212, and other parts not shown in FIG. 3 generally cooperate to provide a desired braking effect on the rear wheel 212. In general, the braking effect improves the walker by slowing its speed and reducing the momentum of the child and walker, thereby increasing the overall stability and safety of the walker.

The preferred configuration of the three rolling supports, which comprises a rear wheel 212 and front swivel casters 214 and 308, provides for specific and advantageous movement characteristic of the preferred child walker 100 in accordance with the present invention. Those characteristics will now be described in more detail.

As can be seen, the rear wheel 212 in cooperation with the axle 302 freely rotates in the longitudinal direction of the child walker 100 (i.e., forward or backward). Of course, the preferred non-swivel rear wheel does not rotate in a lateral or side-to-side direction. Accordingly, the preferred non-swivel rear wheel substantially prevents sideways movement of the child walker. Also, the child may rotate or pivot the child walker 100 about the rear wheel 212 without much difficulty. On the other hand, the swivel casters 214 and 308 allow for easy movement in a plurality of directions with respect to the walker. In this preferred configuration, the movement of the child walker is restricted to improve the overall safety of the child walker.

In particular, the preferred child walker 100 may be readily moved in the forward direction by the child. Additionally, the child may easily swing the walker from side-to-side due to the front preferred caster wheels effectively pivoting about the rear wheel 212. The child walker 100 may move backward, although not as readily as forward. Since the preferred rear wheel does not swivel, the child must push in a substantially rearward direction to move in that direction. If the child, simultaneously pushes to the side and to the rear, however, the preferred child walker is likely to swing to the side pivoting about the rear wheel 212. This feature has been found to prevent advantageously or hinder many children from effectively moving the walker in the rearward direction. Additionally, the child walker 100 does not readily translate in a lateral direction due to the preferred rear wheel 212. In particular, if the child pushes to the side, the rear wheel 212 is incapable of rolling in that direction. If the child pushes hard enough, the rear wheel 212 may skid, of course.

Returning now to FIG. 3, a side base extension 304 and a pair (front 306 and rear 307) of friction strips are shown connected to the upper base member 200. The side base extension 304 is a mirror image of side base extension 204 described above with reference to FIG. 2.

A left support pod 310 is shown opposite the right support pod 210. As shown in FIG. 3, the support pods 210 and 310 generally have a smooth surface which extends toward the floor surface. In the preferred embodiment, the support pods 210 and 310 are raised from a lower surface of the base member 122, and are slightly rounded. As shown in FIG. 3 the support pods 210 and 310 are preferably placed at the outer edge of the rear extensions 134 and 312. Since the child walker preferably includes three support points, the support pods 210 and 310 provide for additional stability when the child leans to the side. As with the swivel wheels, the support pods are located at a maximum distance apart from each other, from the center of mass of the walker, and from the swivel wheels to improve the stability of the walker. It should be understood that during normal rolling operation (i.e., level operation), the support pods do not contact the floor surface, but are displaced a short distance above it. If a sideways tipping motion is encountered, the support pod in the direction of the tipping contacts the floor surface to stop the tipping, thereby increasing the stability of the walker.

FIGS. 4A and 4B show the interconnection of the friction strips to the front or side base extensions. FIG. 4A shows a cutaway view of the rear friction strip 208 installed on the side base extension 204. The friction strip 208 includes three insertion portions 400, 402, and 404 at each end and in the middle. It should be understood that the remaining friction strips are preferably attached in a similar fashion. As can be seen, the lower surface of the friction strip 208 includes a plurality of ridges to improve the gripping power and increase the frictional force created by the floor on the friction strip 208. Each of the three insertion portions 400, 402, and 404, is pushed into an appropriately located slot in a lower surface of the base extension.

FIG. 4B shows a sectional view of one of the insertion portions 400 and a slot 410 on the side base extension 204. The side base extension 204 generally includes a flat lower surface 406 and a receiving channel 408 for receiving the friction strip. At the center of the receiving channel is located a slot 410 defined by left and right diagonal tabs 412 and 414 of the base member 204. The slot 410 is adapted to receive a generally T-shaped portion 416 extending upward from the friction strip 208. As shown in FIG. 4B, the generally T-shaped portion 416 includes a sloping top surface to facilitate insertion past the left and right tabs 412 and 414. After insertion, the T-shaped portion holds the friction strip in place in the receiving channel 408 of the side base extension 204. Shown in dashed lines are the spaced-apart extending tabs 418 from the friction strip 208, discussed above.

As can be appreciated, the friction strips of the present invention can serve to improve its operation. As discussed above, when a rolling support passes over an edge or ledge of the floor surface, the walker immediately tips in the direction of that rolling support, and the base member of the preferred child walker contacts the floor surface to inhibit and stop the child walker from moving. The preferred friction strips will often improve the frictional contact between the base member and the floor surface to more quickly stop the child walker and prevent the child from continuing to move the walker toward the edge.

In a preferred embodiment, at least one of the wheels of the walker comprises a wheel height adjustment structure disposed inside the base member 122. The preferred wheel height adjustment structure allows a wheel to be adjusted between an operating position and a retracted position. The operating position fully extends the wheel to allow for normal operation. The retracted position withdraws the wheel into the base member 122, thereby allowing the base member to contact the floor surface. As can be appreciated, the child walker does not roll freely when one of the wheels is in the retracted position. Of course, the preferred embodiment allows for more than one wheel to be lowered to further brake the child walker. In particular, both front swivel caster 214 and 308 can be lowered in the preferred embodiment, effectively braking the walker to stop it from moving. The preferred friction strips increase the frictional contact between the base member 12 and the floor surface to improve this braking effect.

Figure 5:
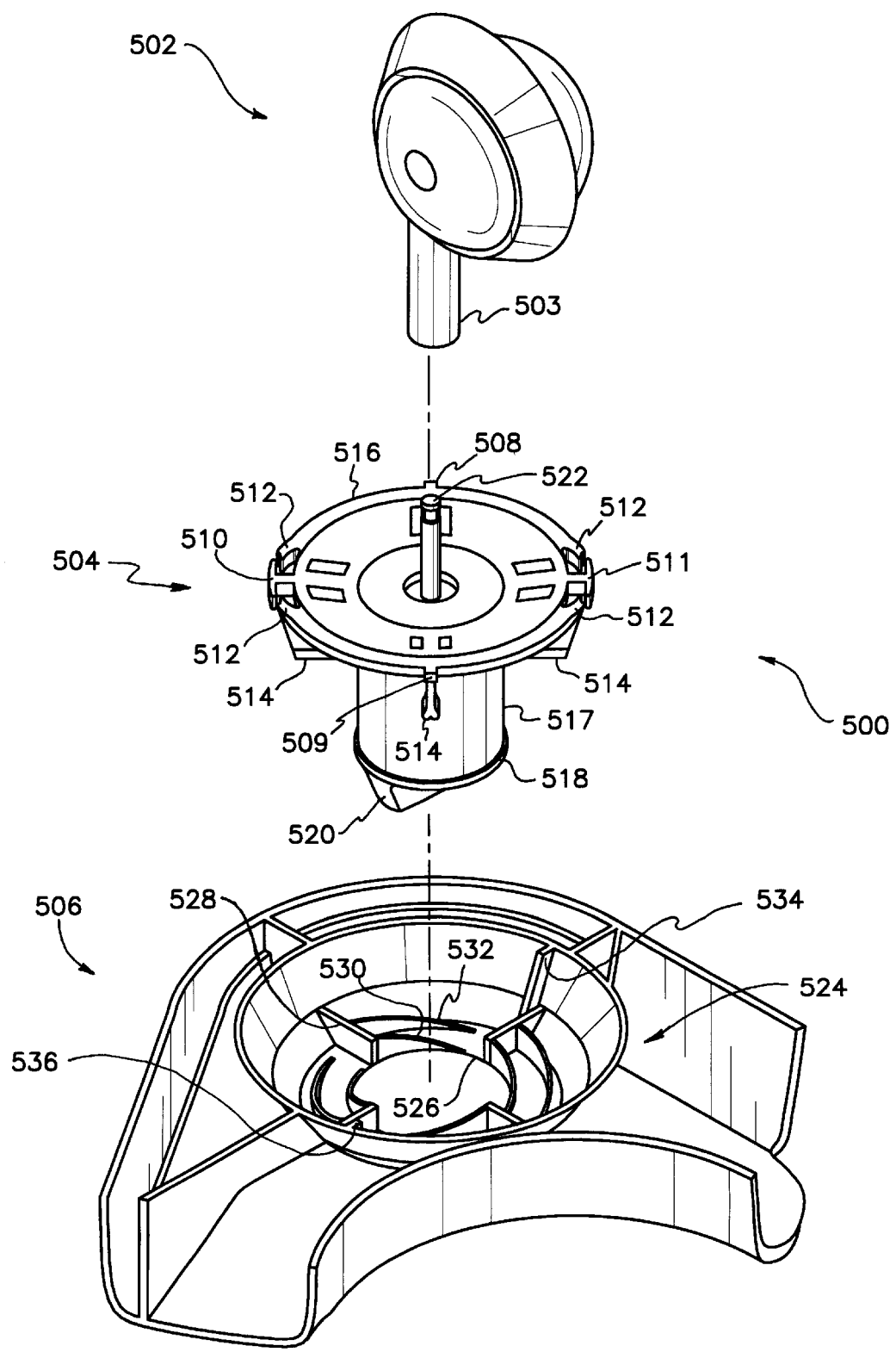
FIG. 5 is a perspective exploded view of a preferred height adjustable caster in accordance with an embodiment of the present invention.

A perspective view of a preferred height adjustment structure 500 is shown in FIG. 5 in exploded form. The height adjustment structure 500 generally comprises a swivel caster wheel 502, a knob structure 504, and a receiving orifice 506.

The swivel caster wheel 502 may be of a conventional type formed of plastic which allows for rotation of the wheel and for simultaneous pivoting of the wheel about a stem 503. The stem 503 is adapted to couple and lock with a post 522 of the knob structure 504.

The knob structure generally includes the post 522, preferably formed of steel, and a flat circular section 516, a tubular section 517, and a knob extension 520, all preferably formed of plastic. The flat circular section 516 includes a pair of stop extension tabs 508 and 509 located on opposite sides of the knob structure 504. A second pair of stop extension tabs 510 and 511 are further included in the flat circular section 516. As explained below, the stop extension tabs 508, 509, 510, and 511 serve to limit the circular rotation of the knob structure within the receiving orifice 506. As shown in FIG. 5, these stop extensions are located at about 90° intervals from one another.

The flat circular section 516 further includes a plurality of locking fingers 512 at its outer periphery and disposed adjacent to the stop extensions 510 and 511. In particular, each stop extension 510 and 511 has a first and second locking finger 512 disposed on either side thereof. As shown in FIG. 5, each locking finger is connected in a cantilever fashion to the flat circular section 516 and is displaced a short distance from the stop extension tabs 510 and 511.

The knob structure 504 further includes a plurality of bearing tabs 514 extending from the bottom of the flat circular section 516 and from the tubular section 517. In the preferred structure shown in FIG. 5, the bearing tabs 514 are disposed below the various stop extension tabs 508, 509, 510, and 511. The bearing tabs 514 cooperate with the internal structure of the receiving orifice 506 to allow the knob structure 504 to move between a retracted position and an operating position as explained in more detail below.

Knob structure 504 further includes a tubular section 517 which is connected to the knob extension 520. A lip 518 is disposed at and extends from the lower end of the tubular section 517. The lip 518 extends radially outward from the surface of the circular extension 516, and is used to secure the knob structure in the receiving orifice 506.

The receiving orifice 506 generally includes a large circular opening 524 at the top surface thereof and a small circular opening 526 disposed at a bottom surface of the receiving orifice 506. A plurality of vertical ribs 528 are disposed on the interior of the receiving orifice 506.

Preferably, four vertical ribs 528 are provided and are located to cooperate with the preferred four bearing tabs 514. An inner sloping rib 530 and an outer sloping rib 532 are provided adjacent to and preferably integral with each vertical rib 528. The inner and outer sloping ribs 530 and 532 are circular in shape, generally follow the small circular opening 526, and generally slope from an upper surface of the vertical rib 528 to a lower surface of the receiving orifice 506.

Vertical stop rails 534 and 536 are also disposed on the inside of the receiving orifice 506 as shown in FIG. 5. As shown in the preferred configuration, the stop rails 534 and 536 are located adjacent to two opposite vertical ribs. Each stop rail preferably extends from the top of the receiving orifice at the large circular opening 524 downward into the receiving orifice 506 to the bottom surface near the small opening 526. The stop rails 534 and 536 cooperate with stop extension 508, 509, 510, and 511 to limit the rotation of the knob structure 504 within the receiving orifice 506 to approximately 90°. The stop rails 534 and 536 also cooperate with locking fingers 512 to maintain the knob structure 504 in a desired position. This cooperation is explained in more detail below with reference to FIG. 7.

Figure 6:
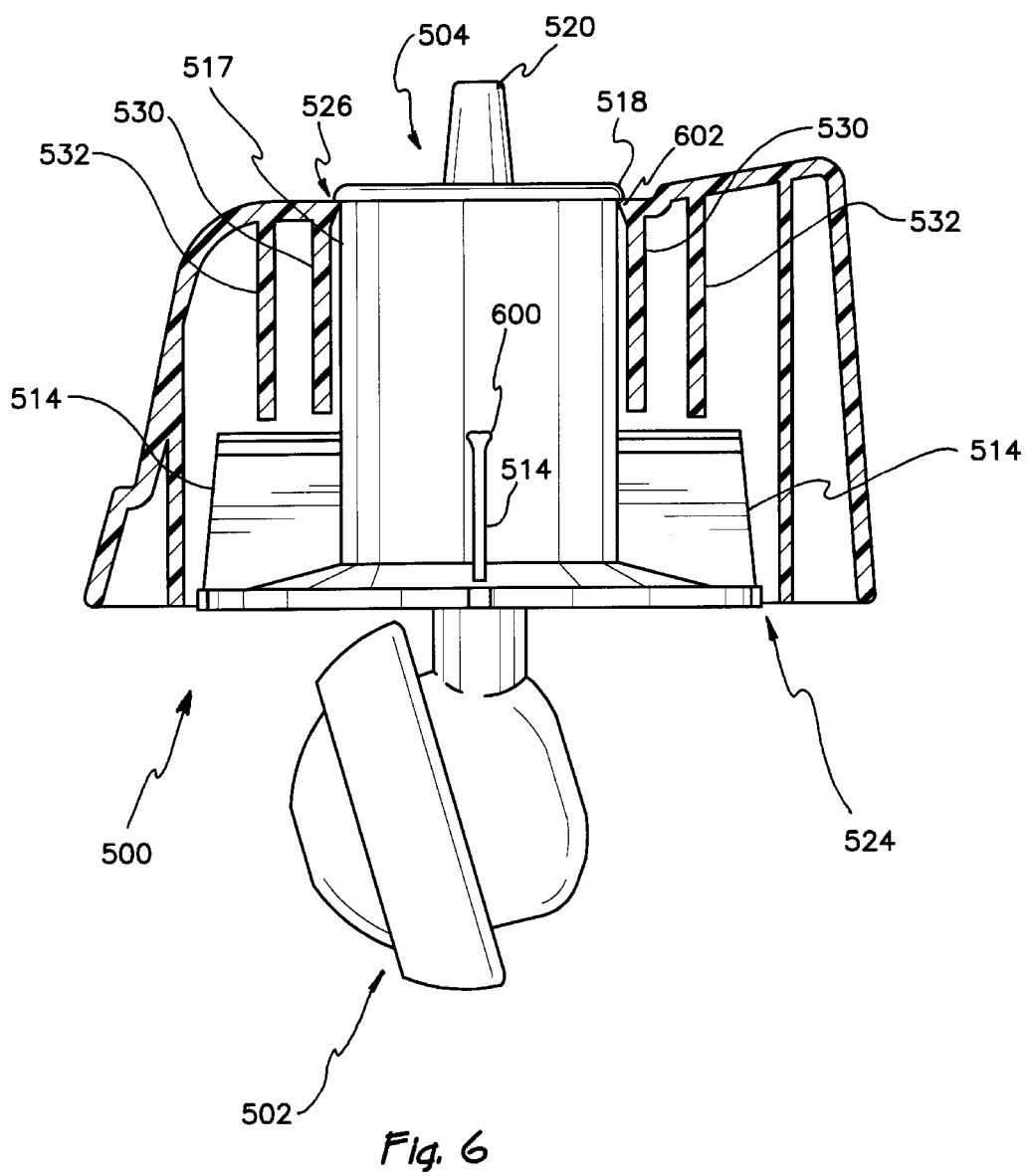
FIG. 6 is a sectional view of a caster in accordance with an embodiment of the present invention.

FIG. 6 shows a view of the height adjustment structure 500 with the receiving orifice 506 shown in section view with the knob structure 504 shown as a plan view in an inserted configuration. FIG. 6 shows the bearing tab 514 in more detail and particularly shows a widened upper bearing surface 600 at the top portion of the bearing tab 514. FIG. 6 also shows, in section, the inner sloping rib 530 and the outer sloping rib 532 which extend downwardly to bear against the bearing surface 600 of the bearing tabs 514. During a operation, the weight of the walker is transmitted through the inner and outer sloping ribs 530 and 532 to the bearing tabs, and then transmitted to the swivel caster wheel 502.

The small circular opening of the receiving orifice 506 is shown in more detail in FIG. 6. In particular, a slightly extending portion 602 of the small circular opening 526 extends inwardly towards the tubular section 517, and the lip 518 bears against the inwardly extending portion 602 to retain the knob structure 504 within the receiving orifice 506. The knob structure is inserted into the receiving orifice by simply forcing the lip 518 with its rounded upper surface against the inwardly extending portion 602 which deflects slightly outwardly to allow the lip 518 to pass through the small circular opening 526.

FIG. 6 shows the height adjustment structure in the operating position with the caster wheel 502 fully extended. It will be appreciated that by rotating the knob structure 504 by use of the knob extension 520, the bearing tabs 514 will slide against the inner and outer sloping ribs 530 and 532 and allow the caster wheel 502 to withdraw into the receiving orifice 506 due to the weight of the walker. Also, a spring (not shown) may be used to facilitate the withdrawal of the wheel.

Figure 7:
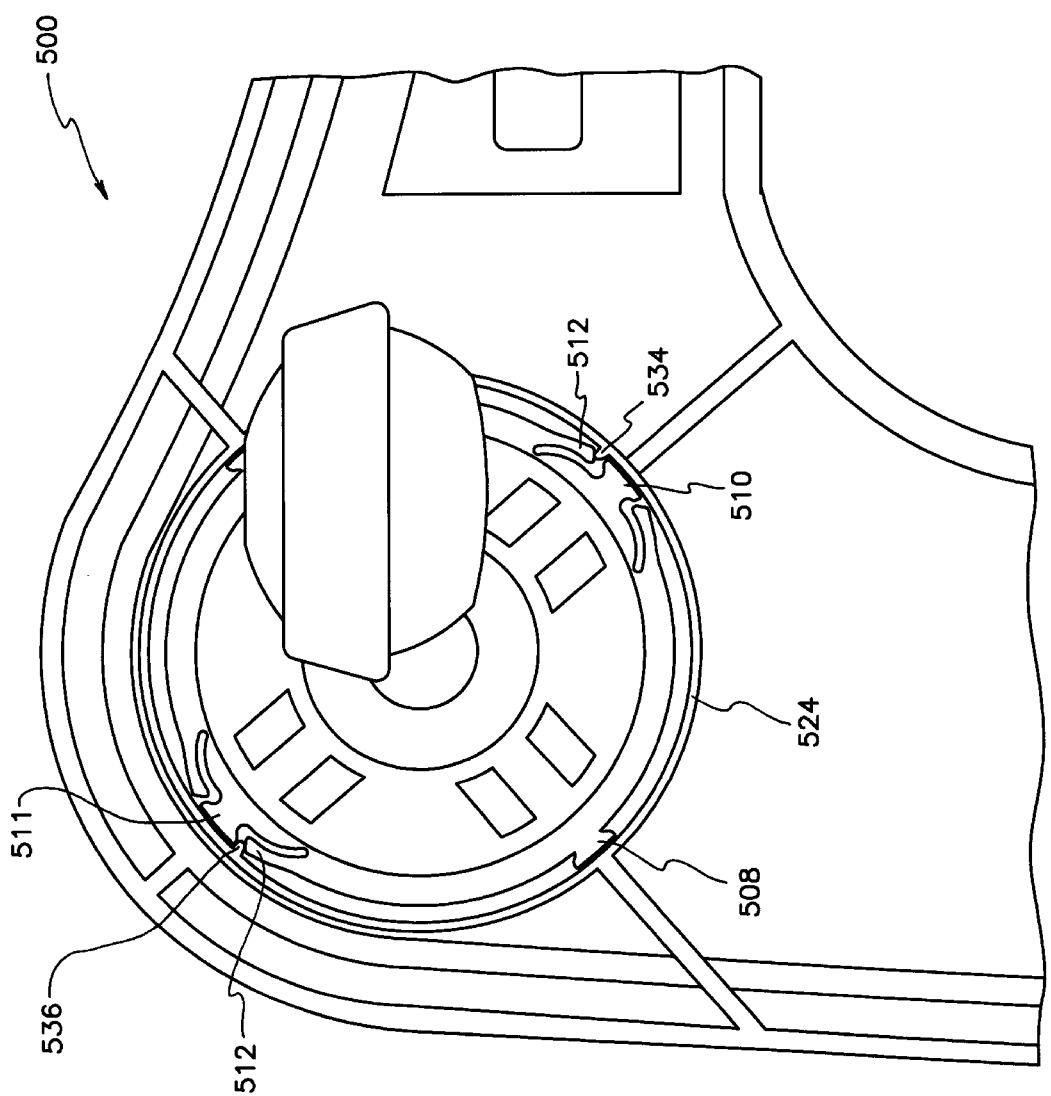
FIG. 7 is a bottom view of a caster in accordance with an embodiment of the present invention shown in the extended position.

FIG. 7 shows a bottom view of the height adjustment structure 500 and shows the cooperation between the stop extension tabs 508, 509, 510, and 511 of the knob structure 504 with the stop rails 534 and 536 in the receiving orifice 506. In particular, FIG. 7 shows a bottom view of the large circular opening 524 with the stop rails 534 and 536 generally located at opposite sides of the receiving orifice 506. The stop rail 534 is shown abutted against and between the stop 510 and locking finger 512. On the opposite side of the receiving orifice 506, the stop rail 536 is shown abutted against and between the stop extension 511 and the locking finger 512. The stop tabs 510 and 511 and the locking fingers 512 serve to hold the knob structure 504 in place and prevent it from rotating, retaining the knob structure 504 in the extended operating position.

It will be appreciated that the locking finger 512 may flex slightly inwardly to allow the knob structure 504 to rotate in the receiving orifice. In particular, the knob structure 504 may rotate in a clockwise fashion from the position shown in FIG. 7. This will allow the knob structure 504 to retract into the receiving orifice with the bearing tabs 514 sliding against the inner and outer sloping ribs 530 and 532 into a retracted position, as discussed above with regard to FIG. 5. The knob structure 504 will rotate approximately 90° until the stop extension 508 abuts against the stop rail 536. On the opposite side, the stop extension 509 (not shown in FIG. 7) will abut against the stop rail 534. This will limit the retraction of the knob structure into the receiving orifice. The weight of the walker will maintain the knob structure 504 in the retracted position. It will be appreciated that the tubular section 517 will freely slide through the small circular opening 526 in the retracted position.

Figure 8:
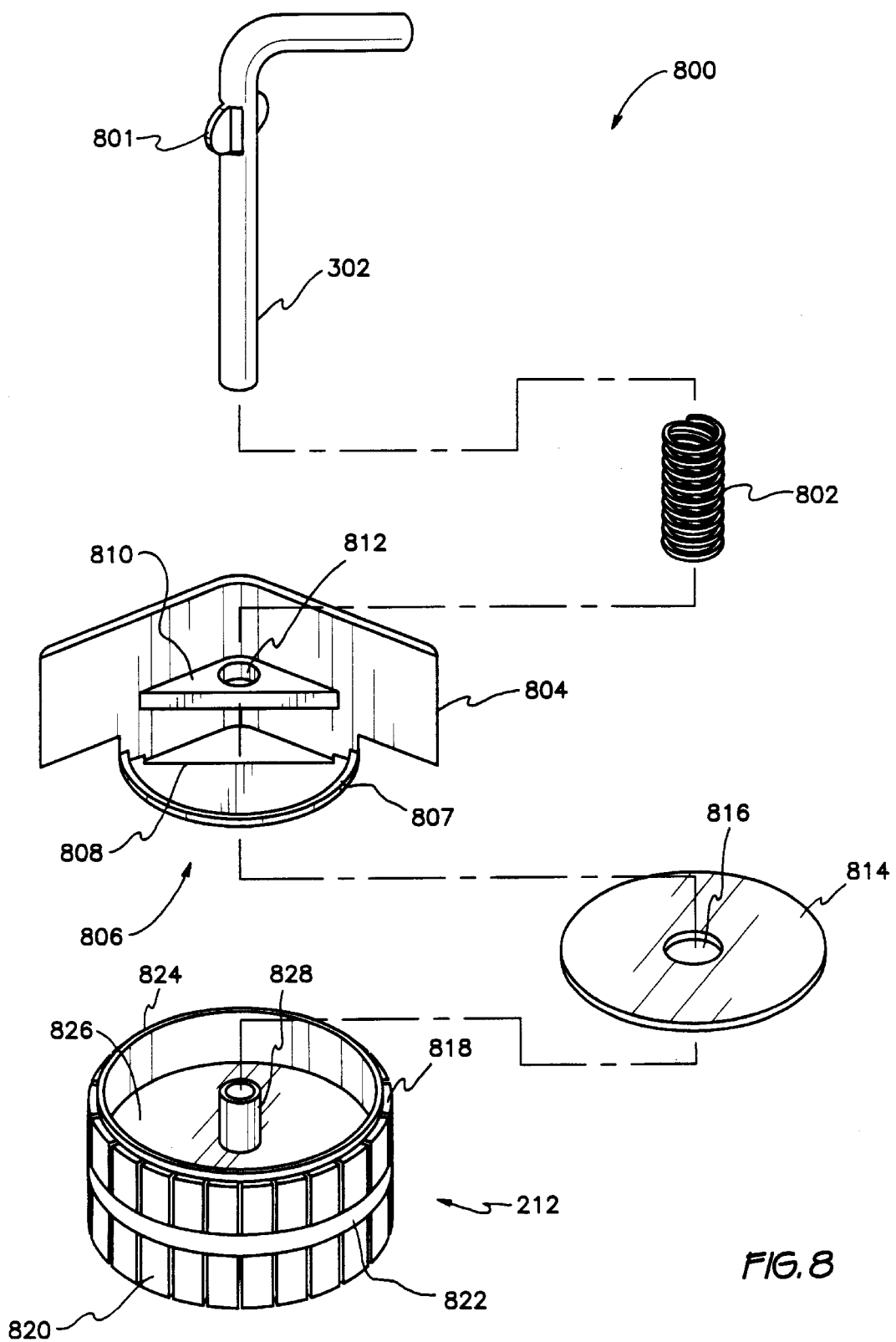
FIG. 8 is a perspective exploded view of a rear wheel in accordance with an embodiment of the present invention.

FIG. 8 shows a partial assembly 800 of an adjustable brake mechanism in accordance with the preferred embodiment including an axle 302, a spring 802, a brake shoe 804, a brake pad 814, and a rear wheel 212. The adjustable brake mechanism provides the general advantage of allowing the caregiver to control the speed of the child walker for children of differing ages and strengths. In particular, the caregiver should preferably adjust the braking effect to prevent the child from achieving unsafe speeds while still allowing the walker to move.

The axle 302 is preferably an L-shaped steel structure with a pair of spring stop wings 801 disposed thereon. The stop wings 801 are designed to receive the surface of the spring 802 when the axle 302 is inserted through the spring 802.

The brake shoe 804 generally comprises a circular shoe surface 806, which includes a generally triangular opening 808 therethrough. The circular shoe surface 806 is disposed on the lower surface of the brake shoe 804 and is generally a flat smooth surface. Surrounding the circumference of the brake shoe surface 806 is a ridge 807, which provides structural rigidity to the surface.

A spring rib 810 is further included on the brake shoe 804, and includes a circular opening 812 therethrough. During assembly, the axle 302 is inserted through the spring 802 and the openings 812 and 808 of the brake shoe 804. The spring 802 is then disposed between the spring rib 810 and the spring stop wings 801 on the axle 302.

The brake pad 814 is a flat, circular pad with a central opening 816 for receiving the axle 302. The brake pad 814 is preferably comprised of a thermoplastic (TPE) material and adapted to engage with the circular shoe surface 806 of the brake shoe 804.

The rear wheel 212 generally includes a tire 818, a rim 824, a hub 826, and an axle receiving rib 828. The tire 818 is preferably comprised of a TPE material, and includes a series of transverse treads 820 with a smooth center portion 822 circumscribing the tire 818. The smooth center portion 822 allows the tire 818 to roll smoothly over the floor surface, whereas the tread 820 improves traction and the braking action.

The rim 824 is adapted to receive the brake pad 814 and the circular shoe surface 800 of the brake shoe 804, and surrounds the hub 826. The hub 826 functions as a brake disc for receiving the brake pad 814. During assembly, axle receiving rib 828 is inserted into opening 816 of the brake pad 814, and through the generally triangular opening 808 of the brake shoe 804.

Then, the axle 302 is inserted through the opening 816 in the brake pad 814 and then into the axle receiving rib 828 of the rear wheel 212. The rear wheel 212 rotates on the axle 302 once assembled.

During operation, it will be appreciated that the axle may slide freely through the spring 802, the brake shoe 804, the brake pad 814, and the axle receiving rib 828. To achieve a braking action, a downward bias (shown in FIG. 5) is provided to the axle to force the spring stop wings 801 against the spring 802, thereby compressing it against the spring rib 810. The spring force is transferred to the circular brake surface 806 through the brake shoe 804 to force the brake pad into the hub (i.e., the brake disc) 826 to achieve a braking action. Of course, if the axle is moved further in a downward direction, the bias created by the spring 802 rises to increase the braking action.

The underside (not shown) of the rear wheel 212 is similar to the topside shown in FIG. 8. Of course, since the flat braking surface on the hub is not required on the underside, it should be appreciated that various reinforcing ribs or struts (not shown) may be included.

Figure 9:
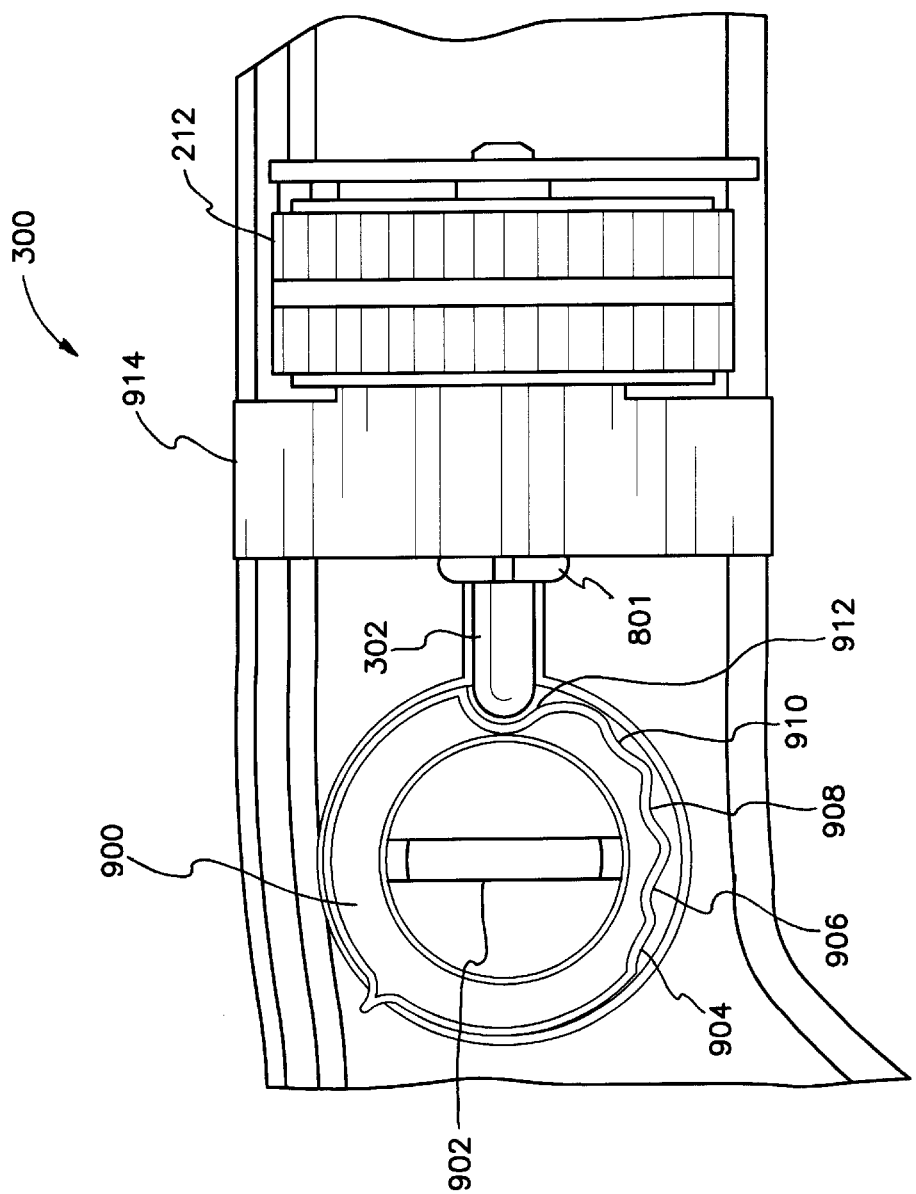
FIG. 9 is a bottom view of a rear wheel of an embodiment of the present invention.

FIG. 9 shows the wheel braking mechanism 300 in detail. In particular, the components of the rear braking mechanism shown include a bias control knob 900, the axle 302, and the rear wheel 212. The spring 802, brake shoe 804, and the brake pad 814 are not shown in FIG. 9 and are located beneath a cover 914.

The bias control knob generally functions to adjust the position of the axle 302 to achieve a desired braking bias for the wheel braking mechanism 300. The bias control knob 900 includes a knob extension 902 to facilitate turning and adjustment by the user, and a plurality of stops 904, 906, 908, 910, and 912 for receiving the axle 302. Each stop is provided at a different radius from the center of the bias control knob 900, and accordingly adjust the axle 302 to a different position, producing a different level of braking effect. Thus, the user can rotate the bias control knob 900 by using the knob extension 902 to place a desired stop against the axle 302 to achieve a desired braking effect. It should be understood that the bias control knob 900 will be preferably adjusted to provide a sufficient amount of braking to control the speed of the walker to a level desired by the caregiver while still allowing the child to move the walker.

Figure 10:
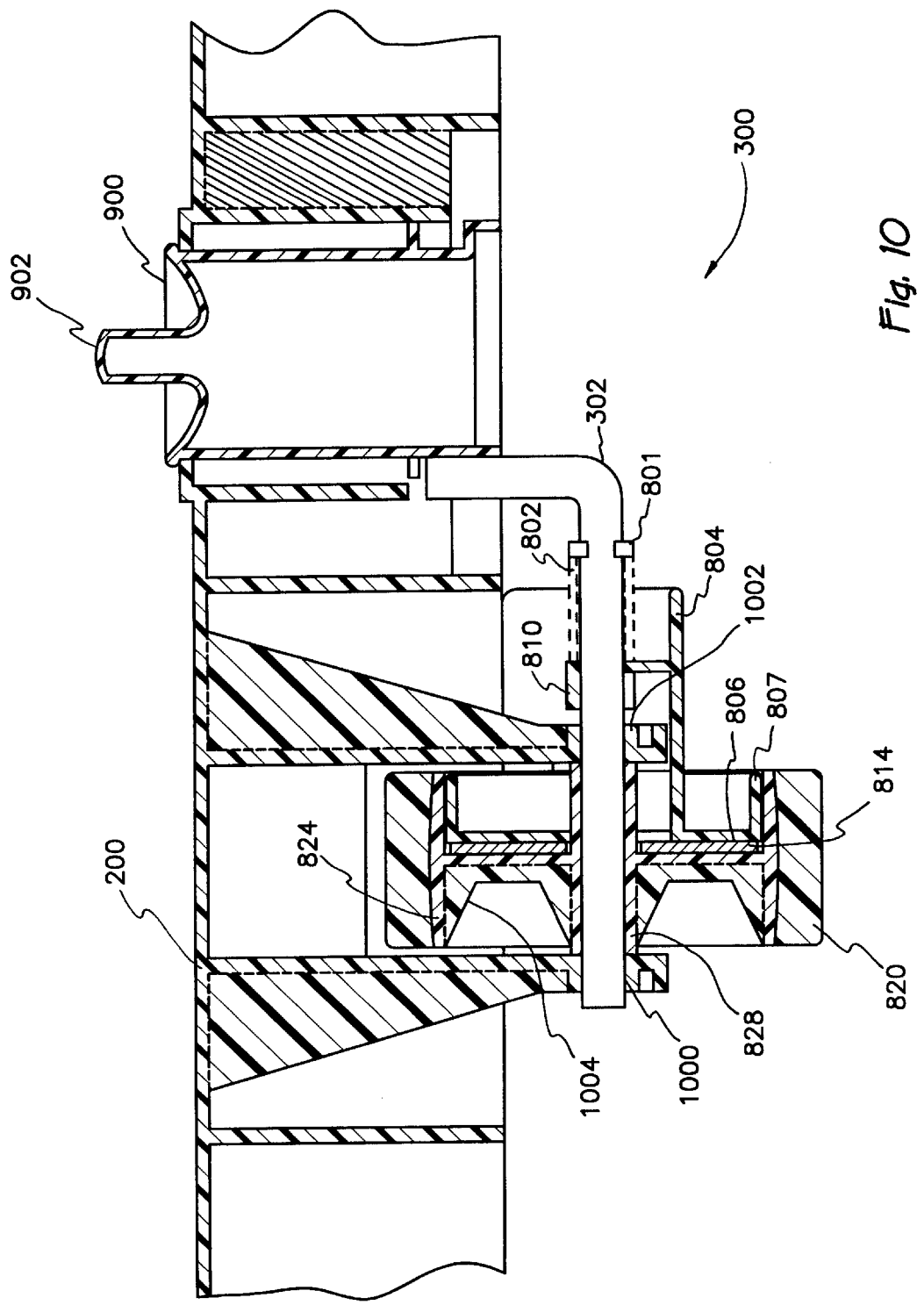
FIG. 10 is a sectional view of a preferred braking mechanism in an assembled configuration according to the present invention.

FIG. 10 shows a sectional view of the preferred braking mechanism in an assembled configuration according to the present invention. The bias control knob 900 is shown adjacent the axle 302, which is inserted through the spring 802, the spring rib 810, and the axle receiving rib 828 circular shoe surface. Also, the axle 302 is inserted through a first and a second receiving orifice 1000 and 1002 in the upper base 200 which maintain the axle in the proper location. Additionally, FIG. 10 shows reinforcing a rib 1004 connected to the rim 824 of the rear wheel 212.

It will be apparent to those skilled in the art that various modifications and variations can be made in the child walker of the present invention without departing from the spirit or scope of the invention. Thus, it is intended that the present invention cover the modifications and variations of this invention provided they come within the scope of the appended claims and their equivalents.

What is claimed is:

1. A rolling mechanism for moving over a floor surface and adapted for connection to a rectangular shaped base member of a child walker, the rolling mechanism consisting essentially of a first rolling support, a second rolling support and a third rolling support arranged in a triangular configuration wherein the first rolling support is disposed on a corner of the base member and the second rolling support is disposed centrally on a side of the base member, and wherein the first rolling support rolls easily in a plurality of directions and the second rolling support rolls more easily in one direction than another to cause the child walker to tend to move in a desired direction over the floor surface, at least one of the rolling supports being vertically fixed with respect to the base member such that when at least one of the first, second and third rolling supports passes an edge of the floor surface, the child walker tips toward the one rolling support and the base member contacts the floor surface to thereby inhibit the child walker from moving.

2. The rolling mechanism of claim 1, wherein the second rolling support comprises a non-swiveling wheel, and the first and third rolling supports each comprises a swiveling caster wheel.

3. The rolling mechanism of claim 2, wherein the non-swivelling wheel substantially prevents sideways movement of the child walker.

4. The rolling mechanism of claim 1, wherein at least one of the plurality of rolling supports comprises a wheel height adjustment structure including a bearing surface adapted to slide against a sloping surface of the base to move the one rolling support between an operating position and a retracted position.

5. The rolling mechanism of claim 1, wherein the second rolling support comprises two wheels centered on a side of the base member.

6. A child walker movable over a floor surface comprising:

a seat structure for holding a child;
a connecting structure connected to the seat structure;
a rectangular shaped base member connected to the connecting structure; and
first, second and third rolling supports being substantially vertically fixed with respect to the base member when moving over the floor surface and configured wherein the first rolling support is disposed on a corner of the base member and the second rolling support is disposed centrally on a side of the base member, and wherein the first rolling support rolls easily in a plurality of directions and the second rolling support rolls more easily in one direction than another to cause the child walker to tend to move in a desired direction over the floor surface such that when at least one wheel passes an edge of the floor surface the child walker tips and the base member contact the floor surface, to thereby inhibit the child walker from moving.

7. The child walker of claim 6, wherein the base member is extended toward a front side of the child walker.

8. The child walker of claim 6, wherein the seat structure is connected to the base member at a position toward a rear of the base member, and away from a front of the base member.

9. The child walker of claim 6, wherein the base member includes a friction strip disposed along a lower surface of the base member to contact the floor surface and improve the stopping ability of the walker.

10. The child walker of claim 9, wherein the base member further includes a plurality of friction strips disposed along the lower surface of the base member.

11. The child walker of claim 9, wherein the friction strip comprises a rubber strip with a plurality of ridges.

12. The child walker of claim 6, wherein the base member comprises a first support pod to provide stability to the child walker.

13. The child walker of claim 12, wherein the first support pod is located at a first corner of the base member, and a second support pod is located at a second corner of the base member.

14. The child walker of claim 6, wherein the second rolling support is centered about a first side of the base member, the first rolling support is connected to the base member at a first end of a second side of the base member, and the third rolling support is connected to the base member at a second end of the second side of the base member.

15. The child walker of claim 14, wherein the second rolling support comprises a non-swivel wheel, and the first and third rolling supports each comprises a swiveling caster wheel.

16. The child walker of claim 14, wherein the second rolling support substantially prevents sideways movement of the child walker.

17. The child walker of claim 6, wherein at least one rolling support further comprises a wheel height adjustment structure disposed inside the base member, the wheel height adjustment structure being selectable between an operating position with the one wheel extended from the base member, and a retracted position with the one wheel withdrawn into the base member, wherein the base member contacts the floor surface when the one wheel is in the retracted position to prevent movement of the walker.

18. The child walker of claim 17, wherein the base member includes a friction strip disposed on a lower surface thereof, and wherein the friction strip contacts the floor surface when the one wheel is in the retracted position.

19. The child walker of claim 17, wherein the wheel height adjustment structure includes a sloping structure connected to the base member, and a knob structure including a bearing surface and connected to the one wheel, the bearing surface adapted to slide against the sloping surface to move the one wheel between the operating position and the retracted position.

20. The child walker of claim 19, wherein the wheel height adjustment structure further includes a stop rail connected to the base member and the knob structure includes a locking finger which cooperates with the stop rail to lock the wheel height adjustment structure in position.

21. A child walker with a speed control feature comprising:
  a seat structure for holding a child;
  a connecting structure connected to the seat structure;
  a rectangular shaped base member connected to the connecting structure;
  a plurality of rolling supports connected to the base member, wherein a first rolling support rolls easily in a plurality of directions and a second rolling support rolls more easily in one direction than another to cause the child walker to tend to move in a desired direction over the floor surface, and wherein the first rolling support is disposed on a corner of the base member and the second rolling support is disposed centrally on a side of the base member; and
  a braking mechanism connected to at least one rolling support for braking the rolling support to thereby control the speed of the child walker.

22. The child walker of claim 21, wherein the second rolling support comprises a non-swiveling wheel, and the second and third rolling support each comprises a swiveling caster wheel.

23. The child walker of claim 21, wherein the braking mechanism includes a brake shoe, a brake disk, and a brake pad disposed between the brake shoe and the brake disk, the brake shoe being movable in a direction toward the brake disk to force the brake pad against the brake disk to provide resistance against rotation of the one wheel.

24. The child walker of claim 23, wherein the brake disk comprises a portion of a hub of the one wheel, and wherein the brake disk is integrally formed with the one wheel.

25. The child walker of claim 23, wherein the braking mechanism further includes an axle with a spring stop wing and a spring, the axle slidably passing through the spring, the brake shoe, the brake pad, and the one wheel, the spring being disposed between the spring stop wing and the brake shoe such that the spring is compressed between the spring stop wing and the brake shoe to provide a bias for the brake mechanism.

26. The child walker of claim 25, wherein the braking mechanism further includes a control knob for adjusting the bias for the brake mechanism.

27. The child walker of claim 26, wherein the control knob includes a plurality of stops and is disposed adjacent the axle, and wherein the axle bears against one of the plurality of stops, each stop having a radius different from the other stops and which corresponds to a different level of bias for the braking mechanism.

28. A child walker movable over a floor surface comprising:
  a seat structure for holding a child;
  a connecting structure connected to the passenger support;
  a rectangular shaped base member connected to the connecting structure;
  a plurality of rolling supports disposed on the base, wherein a first rolling support rolls easily in a plurality of directions and a second rolling support rolls more easily in one direction than another to cause the child walker to tend to move in a desired direction over the floor surface, and wherein the first rolling support is disposed on a corner of the base member and the second rolling support is disposed centrally on a side of the base member.

29. The child walker according to claim 28 wherein the base member includes a first side and second side, the first side having a different length than the second side.

30. The child walker according to claim 28 wherein the base member includes a friction strip.

31. The child walker according to claim 30 wherein the friction strip includes a plurality of ridges.

32. The child walker according to claim 28 wherein the second rolling support includes at least one wheel.

33. The child walker according to claim 28 wherein the second rolling support includes at least two wheels.

34. The child walker according to claim 28 wherein the first rolling support includes a swivel member.

35. The child walker according to claim 28 wherein the second rolling support includes a non-swivel member.

* * * * *